B. T. WINCHESTER.
CAPSULE CUTTING MACHINE.
APPLICATION FILED JULY 19, 1911.
1,118,610.
Patented Nov. 24, 1914.
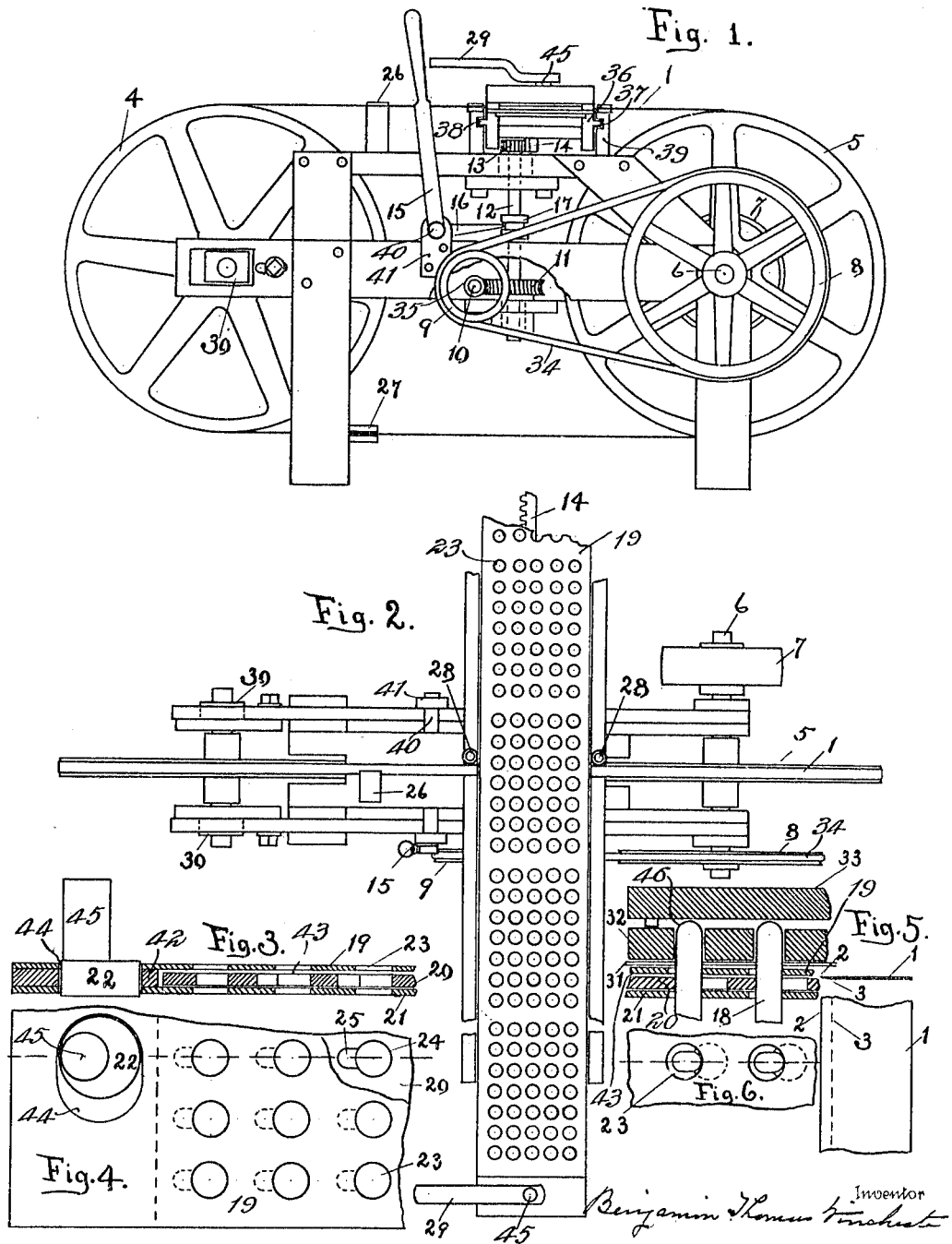

UNITED STATES PATENT OFFICE.

BENJAMIN THOMAS WINCHESTER, OF WINDSOR HILLS, MARYLAND, ASSIGNOR, BY MESNE ASSIGNMENTS, TO SHARP AND DOHME, OF BALTIMORE, MARYLAND, A CORPORATION OF NEW JERSEY.

CAPSULE-CUTTING MACHINE.

1,118,610.        Specification of Letters Patent.      Patented Nov. 24, 1914.

Application filed July 19, 1911. Serial No. 639,243.

*To all whom it may concern:*

Be it known that I, BENJAMIN THOMAS WINCHESTER, a citizen of the United States, residing at Windsor Hills, in the county of Baltimore and State of Maryland, have invented a new and useful Capsule-Cutting Machine, of which the following is a specification.

This invention relates to a capsule cutting machine and has reference to a machine for cutting previously-formed capsules which are of irregular lengths into uniform lengths.

In manufacturing capsules the two parts thereof which telescope to form a complete capsule are formed separately and before bringing the same together they are to be cut the proper lengths, and the present machine is designed to accomplish this cutting.

One object of the present invention is to provide an improved construction of machine whereby the capsule may be delivered thereto in the receivers in which they were deposited from the forming machine and cut in gangs or rows in quick succession.

Another object is to provide improved means for conveying the capsules in a plurality of rows successively past a cutter whereby to cut the same in uniform lengths.

A further object is to provide improved means for clamping the capsules between their ends while conveying them past a cutter.

Another object is to provide an improved gage device to coact with the capsules to properly position them with respect to the clamps whereby accuracy in cutting may be obtained.

Another object is to provide an improved cutter with means for cleaning the same after it has passed through the capsules and made the cut and also having means to lubricate the same before it enters the capsules.

With these and other objects in view, the accompanying drawing illustrates the invention, wherein, Figure 1 is an end elevation of a machine embodying the features of the invention. Fig. 2 is a top plan view of a portion of the same. Fig. 3 is a sectional view taken longitudinally through the pinch plates in open position forming part of the carriage for carrying the capsules. Fig. 4 is a plan view of the structure shown in Fig. 3. Fig. 5 is a view similar to Fig. 3 except that the pinch plate is in closed position and the cutter is shown. Fig. 6 is a plan view of the structure shown in Fig. 5.

Similar numerals refer to similar parts throughout the several views.

Referring to the drawing by numerals, 1, designates an endless band cutter having a bevel, 3, along one side which tapers to a cutting edge, 2. This band is sustained in a taut condition by passing around flat-faced wheels, 4, and 5, respectively which latter are sustained by a suitable frame. One wheel, 4, is mounted in boxes, 30, whereby it may be moved with respect to the other wheel so as to maintain the cutter band in a stretched condition.

The horizontal shaft, 6, which is sustained by the frame and carries the wheel, 5, is provided on one end with a driving pulley, 7, and on the other end said shaft carries a driven pulley, 8, from which motion is transmitted by means of a belt, 34, to a pulley, 9, on a horizontal shaft, 10. This shaft, 10, also carries worm, 35, which meshes with and drives a worm-wheel, 11, on the lower end of a vertical shaft, 12, as shown in Fig. 1. The worm-wheel, 11, is connected to the vertical shaft, 12, by means of a feather or equivalent means, whereby to permit the said shaft to have a vertical movement through said wheel. A pinion, 13, is carried on the upper end of the vertical shaft, 12, and said pinion, when the shaft, 12, is raised, meshes with a horizontal rack, 14, on the under side of a horizontal carriage, 36. The carriage has guide ribs, 37, on its opposite sides which enter grooves, 38, in guides, 39, whereby to permit horizontal reciprocation of the carriage. A hand lever, 15, is carried on a horizontal rock-shaft, 40, which latter is sustained in bracket plates, 41, and said shaft, 40, carries an arm, 16, which is rigid thereon and whose end engages a collar, 17, on the vertical shaft, 12. It is therefore to be understood that the lever, 15, may be operated to rock shaft, 40, and to thereby elevate vertical shaft, 12, thus intermeshing pinion, 13, and rack, 14, to mechanically move the carriage horizontally.

The carriage, 36, has upper and lower flat plates, 19, and 21, respectively and an intermediate or interposed plate, 20. Both upper and lower plates are provided with a plurality of circular holes or perforations, 23, while the middle or interposed plate, 20, is provided with a plurality of perforations, 24, with off-set notches, 25, at one side thereof. At one end a spacer block or plate, 42, is interposed between the top and bottom plates, 19, and 21, as shown in Fig. 3, whereby to space the top and middle plates to form a cutter blade passage, 43. An elliptical opening, 44, is provided in the ends of plates, 19, and 21, and in the spacer block, 42, so that an eccentric block, 22, may be operated therein to cause said plates, 19, and 21, to shift slightly with respect to the interposed plate, 20, for a purpose presently to be explained. The eccentric block, 22, has a stem, 45, to which an operating lever, 29, is attached for the purpose of actuating the block.

Rollers, 28, are mounted on the stationary guides, 39, at the blunt side or edge of the cutter band so as to maintain the band in a given vertical plane during the cutting operation.

An oiling device, 26, is provided at the side of the traveling cutter band, 1, so as to contact with the latter and grease the same with olive oil. In a somewhat similar manner is the cutter band cleaned by passing a contacting wiper, 27, after the cutting operation.

In Fig. 5, of the drawing a sectional view is shown illustrating the operation of cutting the capsules. In said figure the numeral, 18, designates the uncut capsules which are held in a receiver, 31, which is simply a perforated sheet of cardboard or equivalent material. The capsules are also shown as extending down through the perforations, 23, in the upper plate, 19, of the carriage; then through the off-set notches, 25, in perforations, 24, of the interposed plate, 20, and finally through the perforations, 23, in the lower plate, 21. In this Fig. 5 it will also be noted that the band cutter, 1, is in alinement with cutter-blade passage, 43, so as to cut the capsules between the upper plate, 19, and the interposed plate, 20. In this view (Fig. 5) the plates, 19, and 21, are shown shifted with respect to plate, 20, thereby clamping the capsules during the cutting. A weighted block, 32, having perforations, 46, is seated on the receiver sheet, 31, around the capsules so as to keep the receiver seated on the carriage. A gage block, 33, is also shown on top of the weighted block, 32, so as to force the closed ends of the capsules down a predetermined distance to determine the point where the cut is to be made by the blade, 1, as the carriage moves the capsules crosswise of the traveling cuttter.

The capsules to be cut are brought to the cutting machine in the receiver sheets, 31, and the sheets are laid on the top plate, 19, with the capsules projecting through perforations, 23, 24, and 23. The weighted block, 32, is then placed on the receiver and the projecting closed ends of the capsules enter the perforations, 46, and finally the gage block, 33, is placed on the closed ends of the capsules to push the latter down the required distance. Lever, 29, is next operated to pinch or clamp the capsules and finally lever, 15, is actuated to start the carriage to travel crosswise of the cutter band so as to cut the lower ends off and leave the upper ends of a uniform length.

Having thus described my invention what I claim and desire to secure by Letters Patent is—

1. In a machine for cutting capsule parts the combination with a cutter, of a carriage having a plurality of plates with perforations therein to receive the capsule parts to be cut; means for permitting a relative shifting of said plates to cause the walls of the perforations to clamp the capsule parts and means for causing a movement between the cutter and the plates to bring the capsules into cutting position.

2. In a machine for cutting capsule parts the combination with a cutter, of a carriage having a plurality of plates with capsule-receiving perforations in said plates,—the said plates being spaced to provide a passage for the cutter between them and means for bringing the capsule parts and cutter together.

3. In a machine for cutting capsule parts the combination with an endless cutter band, of a carriage movable in a direction crosswise of said cutter band, said carriage having a plurality of perforated plates to receive and clamp the capsule parts to be cut and means for moving said carriage past the cutter band with one of its perforated plates on one side of said band and another of its plates at the opposite side of said cutter band.

4. In a machine for cutting capsule parts the combination with an endless band cutter, of means for moving said endless band cutter continuously; a carriage; pinch plates carried by the carriage and at opposite sides of the endless band cutter and means for moving said carriage and pinch plates crosswise of said band cutter to cut the capsule parts between the pinch plates.

5. In a machine for cutting capsule parts the combination with spaced apart wheels, of an endless cutter band carried by said wheels; a carriage sustained in a plane between the wheels and extending crosswise of the cutter, said carriage having means to clamp the capsule parts that are to be cut and means for moving the carriage and the clamped capsule parts in a direction crosswise of the cutter to present the capsule parts to the cutter.

BENJAMIN THOMAS WINCHESTER.

Witnesses:
THEODORE SCHMECKEBIER,
ELI FRANK.